United States Patent
Carpenter et al.

(10) Patent No.: US 6,271,983 B1
(45) Date of Patent: Aug. 7, 2001

(54) ROTARY ACCESS PORT FOR AUTOMATED TAPE LIBRARY

(75) Inventors: Kipley T. Carpenter, Thornton; Mike A. Aschenbrenner, Westminster, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/435,017

(22) Filed: Nov. 5, 1999

(51) Int. Cl.$^7$ .................................................. G11B 15/68
(52) U.S. Cl. ................................................................ 360/92
(58) Field of Search ..................... 360/92, 98.04, 360/98.05, 98.06; 221/83; 414/932; 369/37, 36

(56) References Cited

U.S. PATENT DOCUMENTS

| | | |
|---|---|---|
| 3,504,808 | 4/1970 | Carabateas . |
| 4,287,541 | 9/1981 | Tanahashi et al. . |
| 4,458,802 | 7/1984 | Maciver et al. . |
| 4,498,603 | 2/1985 | Wittenborg . |
| 4,779,151 | 10/1988 | Lind et al. . |
| 4,879,615 | 11/1989 | Teranishi et al. . |
| 4,945,429 | 7/1990 | Munro et al. . |
| 5,278,708 * | 1/1994 | Apple et al. ............................ 360/92 |
| 5,429,470 | 7/1995 | Nicol et al. . |
| 5,449,229 * | 9/1995 | Aschenbrenner et al. ............. 360/92 |
| 5,454,485 | 10/1995 | Dalziel . |
| 5,524,443 | 6/1996 | Frank . |
| 5,613,154 | 3/1997 | Burke et al. . |
| 5,940,243 | 8/1999 | Kanetsuku et al. . |
| 6,088,189 * | 7/2000 | Utsumi et al. ......................... 360/92 |

FOREIGN PATENT DOCUMENTS

| | | |
|---|---|---|
| 3918198 C1 | 2/1990 | (DE) . |
| 0 288 165 A2 | 10/1988 | (EP) . |
| 61-150908 | 7/1986 | (JP) . |

OTHER PUBLICATIONS

IBM Technical Disclosure Bulletin; vol. 16, No. 10, Mar. 1994; entitled "Tape Library Apparatus"; by R. L. Schaaf; pp 3145–3146.

* cited by examiner

Primary Examiner—Robert S. Tupper
(74) Attorney, Agent, or Firm—Brooks & Kushman P.C.

(57) ABSTRACT

An automatic rotary access port for a robotic tape library machine includes an operator access port door in the form of a shell mounted about a stationary tape cartridge holder. The shell is controllably rotatable between an open position that allows an operator access to insert or remove tape cartridges from the stationary holder, and a closed position allowing cartridge access by a robotic tape handling mechanism located within the library machine. Cartridges are inserted and removed with labels facing a robot side of the library and remain fixed in an initial cell position within the holder. The shell is formed with an opening therein that is dimensioned to permit insertion of a tape cartridge into the holder when the shell is in the open position. The shell is configured relative to a corresponding access opening in the housing of the library machine such that a portion of the shell always blocks any direct contact between an operator and the inside of the library machine.

7 Claims, 3 Drawing Sheets

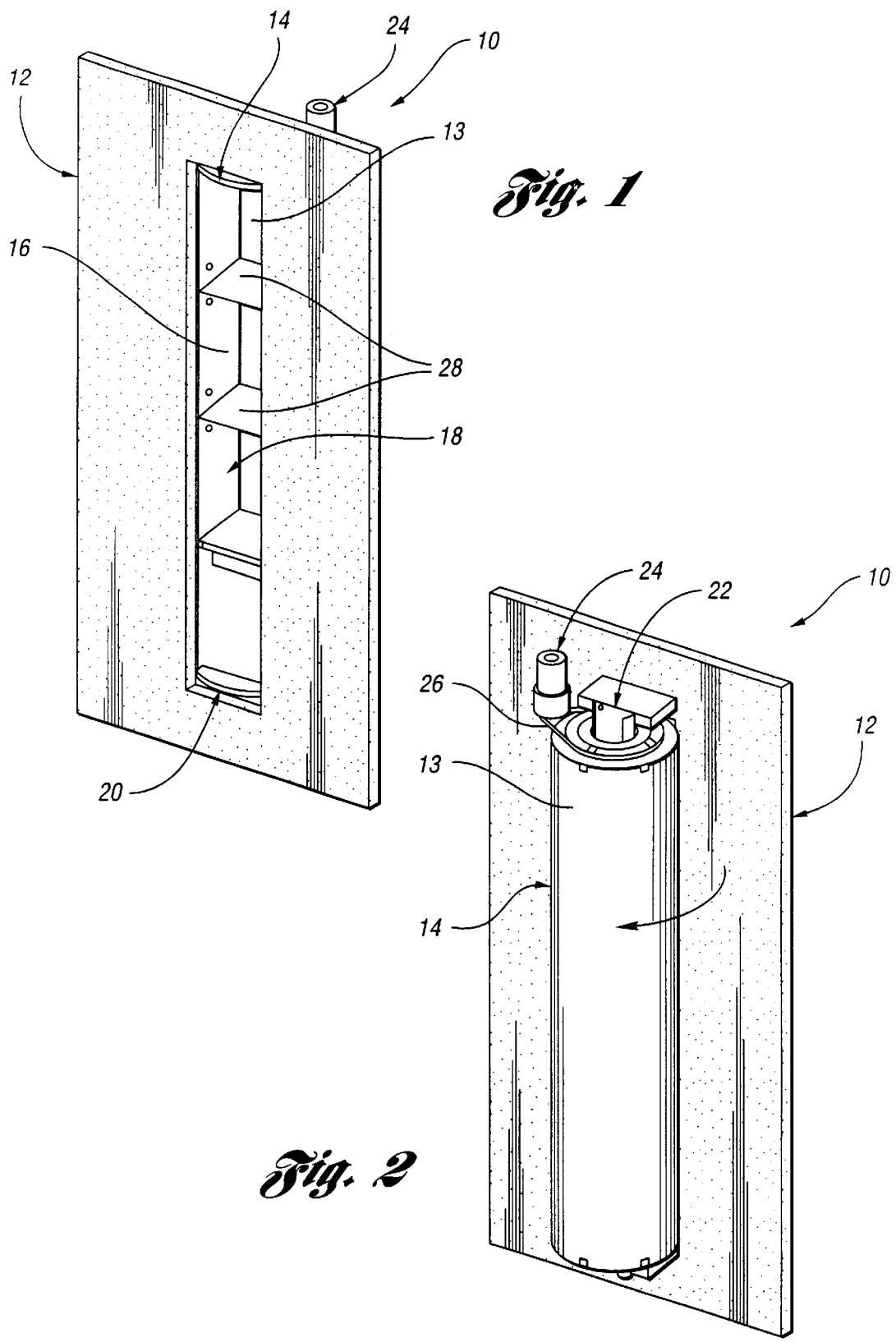

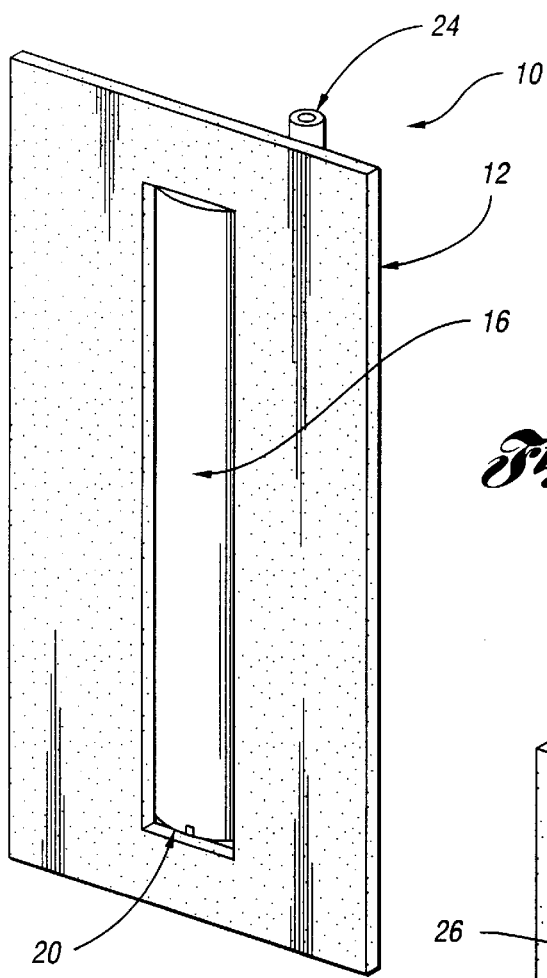
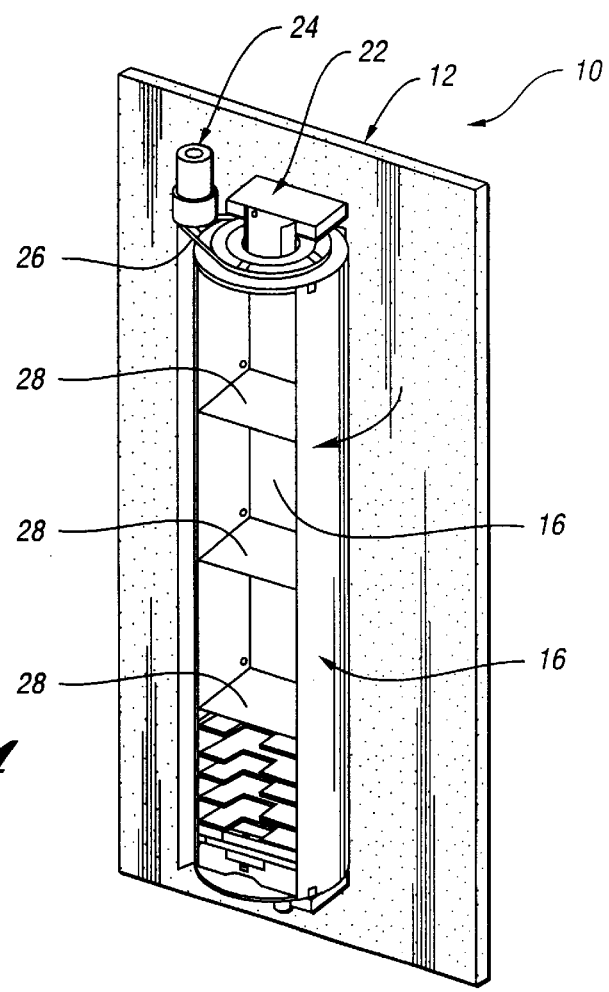

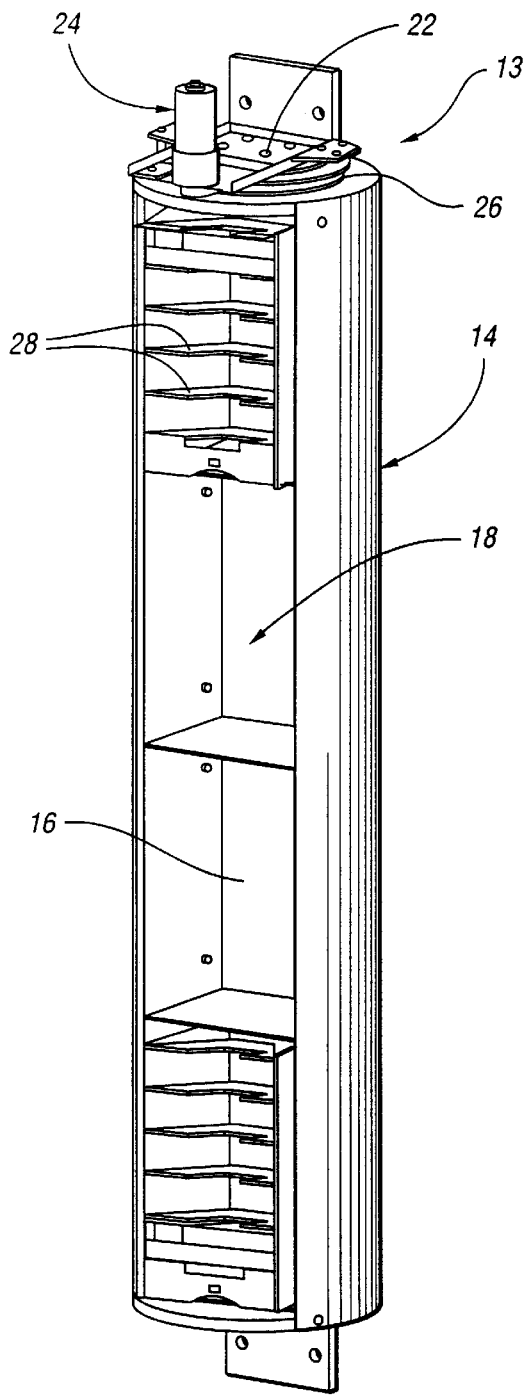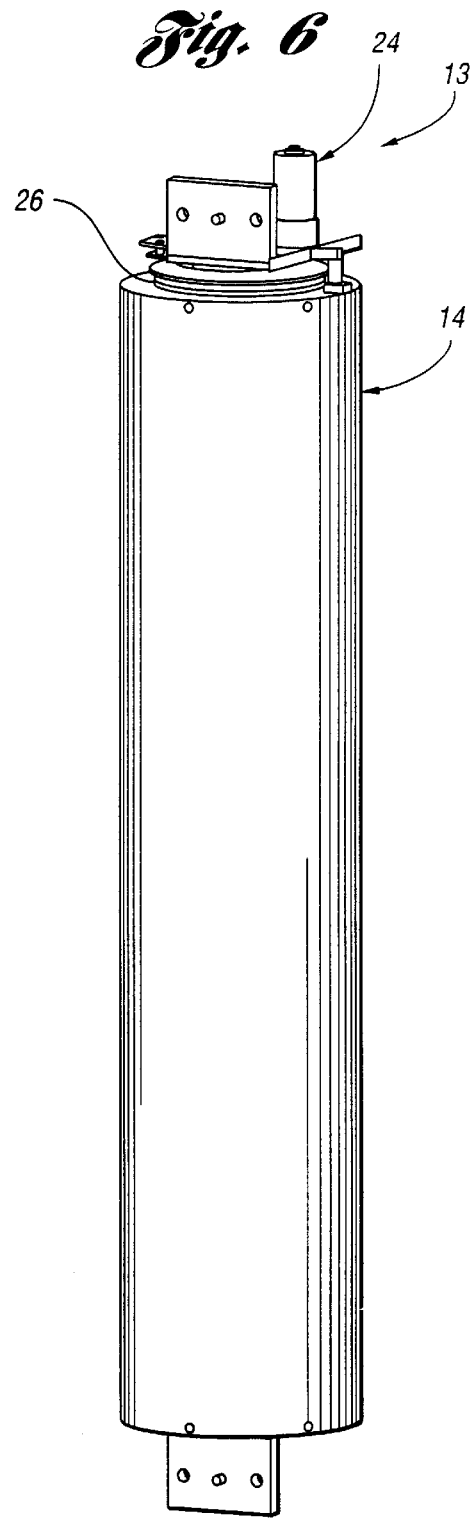

ROTARY ACCESS PORT FOR AUTOMATED TAPE LIBRARY

TECHNICAL FIELD

The present invention relates to automated tape library machines used for mass storage of data, and more particularly to an improved access port which allows removal of a tape cartridge while minimizing the risk of operator injury.

BACKGROUND ART

Automated tape library machines have been used to greatly increase the efficiency and ease at which large quantities of data, such as generated by a computer network, can be stored and accessed by external host systems. Such machines are well known in the art, and generally include a robotic unit that moves within a housing under control of a microprocessor to retrieve and load desired tape cartridges into a tape drive unit. Theses machines further include a customer access port (CAP) or door arranged to allow a user to insert and remove data storage cartridges into the automated tape library machine without taking the entire machine off-line.

The mechanical design of a CAP for any given tape library machine must satisfy a wide variety of design factors relating to particular functional, safety, aesthetic, economic, and reliability requirements. Of these design factors, safety is perhaps the most important. In other words, customer operation of a CAP must be safe at all times such that at no time can the operator be in danger of physical harm from the moving robotic mechanisms of the library. Known CAP arrangements typically provide an input slot for receiving a cartridge from the customer, and a mechanism that subsequently moves the inserted cartridge from the input slot into engagement with the robotic tape system. Other arrangements use a tape loading and unloading mechanism that rotates one or more inserted tape cartridges from a position in which the tapes face outwardly through an opening in the library housing, to a position in which the tapes face inwardly so as to be accessible by a transport/robotic mechanism. An example of such a rotary arrangement is provided in U.S. Pat. No. 4,779,151 to Lind et al.

However, known CAP arrangements that use mechanisms to transport a tape from a user accessible position to a robot accessible position typically suffer the drawback of requiring expensive and complicated mechanical arrangements in order to meet high speed tape loading/de-loading and reliability demands. Therefore, a need exists for a simple access port arrangement which is both reliable and does not compromise customer/user safety

DISCLOSURE OF INVENTION

It is therefore an object of the present invention to provide an automatic access port and method for controlling access to a tape retaining mechanism in a tape library machine which allows a tape to remain fixed in an initial cell position during loading and unloading, while preventing any potential contact between an operator and a robotic mechanism located inside the machine.

It is another object of the present invention to provide an access control method and an automatic access port for a tape library machine which is arranged to controllably rotate a door about a stationary tape retainer mechanism so as to allow operator access to the tape retainer mechanism when the door is in an open position, and robot/transport access to loaded tape cartridges when the door is in a closed position, wherein the open and closed positions prevent any potential contact between the operator and robot mechanism during loading and unloading of a tape into the library.

In accordance with these and other objects, the present invention provides an access port mounted to an automated tape cartridge library housing for allowing insertion and removal of tape cartridges from the library that includes a cartridge access opening formed in the library housing, a stationary cartridge retainer mechanism positioned within the access opening so that tape cartridges can be loaded and unloaded through the cartridge access opening, and a shell rotatably mounted adjacent the access opening and positioned to rotate about the stationary cartridge retainer mechanism. The shell includes an opening in the surface thereof to allow operator loading and unloading of a tape cartridge from the stationary cartridge retainer when the shell is rotated to an open position, and library access to the stationary cartridge retainer when the shell is rotated to a closed position. The rotatable shell and the shell opening are dimensioned relative to the cartridge access opening such that a portion of the shell is always positioned between an operator side of the access port and the inside of the tape library.

In accordance with one aspect of the present invention, an automatic rotary access port for an automated tape library utilizes a door arranged to rotate about a stationary tape holder to meet the above noted safety and performance criteria. The door is controllably rotatable between an open position that allows an operator to insert or remove tape cartridges from the stationary holder, and a closed position allowing access to a tape cartridge by a robot tape handling mechanism located within the library. Cartridges are inserted and removed with labels facing the robot side of the access port and remain fixed in an initial cell or slot position within the holder during the rotation. This simplifies the tape access mechanism required by a library robot in order to access a loaded tape cartridge. In addition, because a loaded rape cartridge remains stationary, reliability of cartridge positioning and alignment when accessed is improved. The door is formed as a shell having an opening therein dimensioned to accept insertion of a tape cartridge into an inner cavity of the shell for placement within a retaining slot. The shell is configured relative to a corresponding opening in an access panel or side in the housing of the library such that a portion of the shell is always positioned between an operator and the inside of the library machine. In a preferred embodiment, the shell is cylindrical shaped, and the opening in both the shell and tape library is smaller than a 90 degree arc in the outer surface of the shell, thereby insuring that a portion of the shell is always positioned between the operator and the inside of the library even during rotation of the shell.

In accordance with yet another aspect of the present invention, a method is provided for controlling access to a stationary tape retainer mechanism positioned within an access opening in an automated tape cartridge library housing for allowing insertion and removal of tape cartridges from the library, wherein the method includes positioning a door to rotate about the stationary cartridge retainer mechanism, the door comprising an opening in the surface thereof to allow operator loading and unloading of a tape cartridge from the stationary cartridge retainer when the door is rotated to an open position, and library access to the stationary cartridge retainer when the shell is rotated to a closed position. The door is selectively operated to rotate to either a closed position which allows a robotic mechanism within the library housing access to the tape retainer mechanism, or the open position to provide a barrier between the access opening and the inside of the library housing. The door and door opening are dimensioned relative to the cartridge access opening such that a portion of the door is always positioned between an operator side of the access port and the inside of the tape library irrespective of whether the door is in the open or closed position.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective diagram of an automated tape library rotary access port in an open position as seen from an external view relative to the tape library machine;

FIG. 2 is a perspective diagram of an automated tape library rotary access port in an open position as seen looking outwardly from within the tape library machine;

FIG. 3 is a perspective diagram of an automated tape library rotary access port in a closed position as seen from an external view relative to the tape library machine;

FIG. 4 is a perspective diagram of an automated tape library rotary access port in a closed position as seen looking outwardly from within the tape library machine;

FIG. 5 is a perspective frontal view of the rotary door of the present invention; and FIG. 6 is a perspective rear view of the rotary door of the present invention.

BEST MODE FOR CARRYING OUT THE INVENTION

FIGS. 1–4 illustrate an automated rotary access port 10 for an automated tape library machine 12 in accordance with the present invention. More specifically, the access port includes a door 13 formed from a shell 14 having an opening 16 located therein. A front and rear view showing door 13 in isolation is provided in FIGS. 5 and 6 respectively. Opening 16 allows tape cartridges to be inserted and removed from a tape retention arrangement 18 integrated or mounted within an inner cavity of the shell. In a preferred embodiment, the shell is cylindrical in shape. As best seen in FIGS. 1 and 4, shell 14 is dimensioned to have a diameter large enough such that opening 16 and a corresponding access opening 20 provided in an access panel in the housing of library tape machine 12 are large enough to accept a tape cartridge, but smaller than a 90 degree arc of the shell circumference. Such an arrangement insures that a portion of shell 14 always extends past both sides of opening 20 thereby providing a barrier between an operator and the inside of the library machine. Library machine 12 can be of any conventional design, and includes a tape retrieval robot mechanism located therein.

Shell 14 is rotatably mounted to the inside wall of the library machine housing via a suitable shaft and journal mechanism 22. While only one mechanism is shown, it will be appreciated that both ends of shell 14 can be mounted to a shaft journaled on the inside of the library housing or access panel. An electric motor 24 is also mounted to the library housing and coupled to the shell shaft so as to controllably rotate the shell into an open position as shown in FIGS. 1 and 2, or a closed position such as shown in FIGS. 3 and 4. In the embodiment shown, motor 24 drives a belt 26 wrapped via a set of shaft mounted pulleys to cause rotation of shell 14. However, such a belt drive arrangement is not to be construed as limiting since one of ordinary skill in the art will readily appreciate that other gear or shaft drive arrangements could be alternatively employed. For example, motor 24 could be transverse mounted relative to shell 14 and include a worm gear drive mechanism. Operation of motor 24 can be controlled from a control panel switch (not shown) mounted on the outside of the library housing near opening 20, and/or from any other suitable remote operator interface.

A stationary tape retention arrangement 18 includes at least one slot or cell 28 arranged to retain a tape in position until accessed by a robotic tape mechanism (not shown) located within library machine 12. As shown, tape retention arrangement preferably forms a vertical stack of cells 28 allowing insertion of multiple tape cartridge volumes into the library machine at the same time. Shell 14 is formed and dimensioned so as to rotate about tape retention 18 when operated between open and closed positions.

In operation, an operator controls the motor to rotate the cylindrical shell into the open position of FIGS. 1 and 2. In the open position, an operator will have direct access to stationary tape retention arrangement 18 to allow insertion or removal of cartridges. Tape cartridges are inserted with a label end facing toward the robot side of the access port. Once the desired tape cartridges have been inserted, the motor is controlled to rotate the shell into the closed position of FIGS. 3 and 4. Once in the closed position, the library machine robot will have direct access to the loaded tape cartridges. During access port operation, the dimensioning of shell 14, opening 18, and opening 20 insure that at no time can an operator reach into the library machine, thereby preventing potential injury resulting from contact with the robot mechanism located therein.

Thus, the access port of the present invention is mechanically safe at all times, which in turn obviates the need to take the library machine off-line simply to load and unload tape cartridges. In addition, reliability of access by the machine robot is improved because the loaded cartridges remain stationary within the access port shell until engaged by the robot.

While the best mode for carrying out the invention has been described in detail, those familiar with the art to which this invention relates will recognize various alternative designs and embodiments for practicing the invention as defined by the following claims.

What is claimed is:

1. An access port mounted to an automated tape cartridge library housing for allowing insertion and removal of tape cartridges from the library, said access port comprising:

a cartridge access opening formed in the library housing;

a stationary cartridge retainer mechanism positioned within the cartridge access opening so that tape cartridges can be loaded and unloaded through the cartridge access opening; and a shell rotatably mounted adjacent the access opening and positioned to rotate about the stationary cartridge retainer mechanism, said shell comprising an opening in the surface thereof to allow operator loading and unloading of a tape cartridge from the stationary cartridge retainer when the shell is rotated to an open position, and library access to the stationary cartridge retainer when the shell is rotated to a closed position, wherein the rotatable shell and the shell opening are dimensioned relative to the cartridge access opening such that a portion of the shell is always positioned between an operator side of the access port and the inside of the tape library.

2. The access port of claim 1 wherein the shell is cylindrical shaped.

3. The access port of claim 2 the shell has a diameter large enough so that the shell opening and the cartridge access opening are large enough to accept the dimension of a tape cartridge, but smaller than a 90 degree arc of the shell circumference.

4. The access port of claim 1 further comprising a motor connected to the shell to control rotation between the open position in which the shell opening and the cartridge access opening are aligned and opposed to allow operator access to the tape retainer mechanism, and the closed position in which the shell opening is aligned and opposed to a robot tape handling mechanism located inside the tape library.

5. The access port of claim 1 wherein the stationary cartridge retainer mechanism comprises a vertical stack of cells each arranged to retain a tape cartridge, thereby allowing insertion of multiple tape cartridge volumes into the library machine at the same time.

6. The access port of claim 1 wherein the stationary cartridge retainer mechanism is oriented relative to the cartridge access opening and a robotic tape mechanism in the library so that cartridges are inserted and removed with labels facing the inside of the tape library housing.

7. A method for controlling access to a stationary tape retainer mechanism positioned within an access opening in an automated tape cartridge library housing for allowing insertion and removal of tape cartridges from the library, said method comprising:

positioning a door to rotate about the stationary cartridge retainer mechanism, the door comprising an opening in the surface thereof to allow operator loading and unloading of a tape cartridge from the stationary cartridge retainer when the door is rotated to an open position, and library access to the stationary cartridge retainer when the shell is rotated to a closed position;

selectively operating the door to rotate to either a closed position which allows a robotic mechanism within the library housing access to the tape retainer mechanism, or an open position which provides a barrier between the access opening and the inside of the library housing; and dimensioning the door and door opening relative to the cartridge access opening such that a portion of the door is always positioned between an operator side of the access port and the inside of the tape library irrespective of whether the door is in the open or closed position.

* * * * *